Inventors
D. Macadie
C. F. Ratcliff

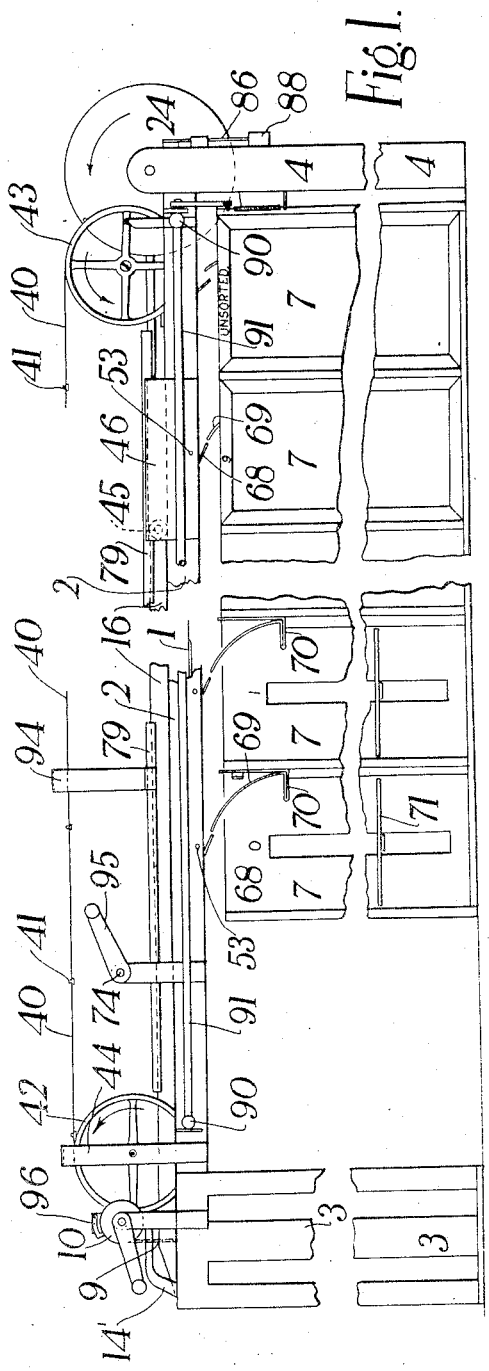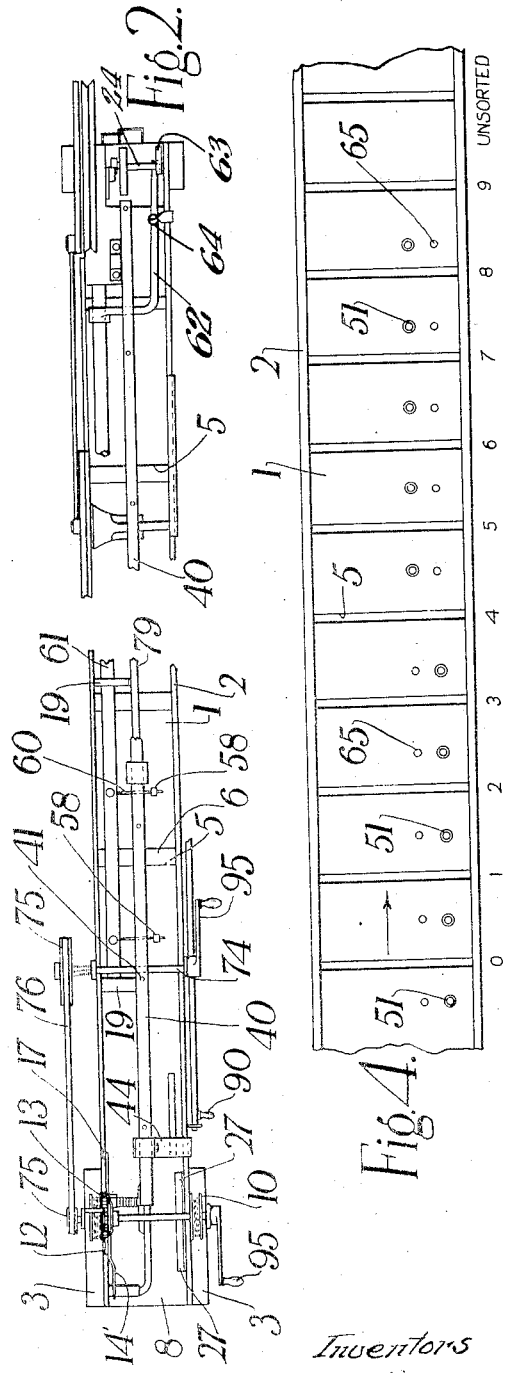

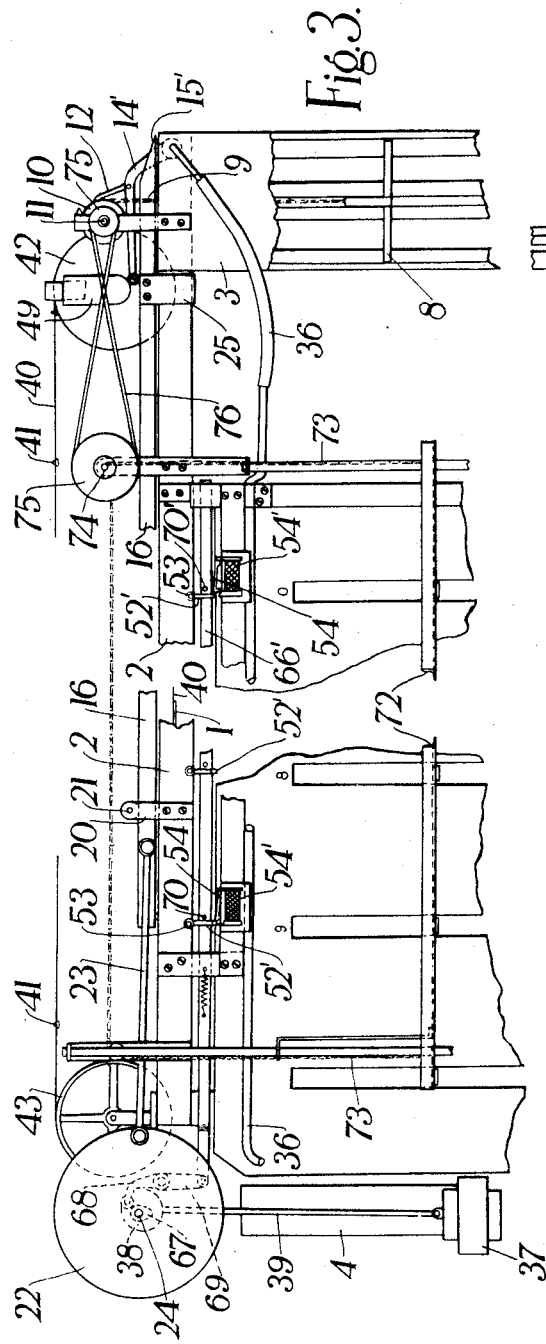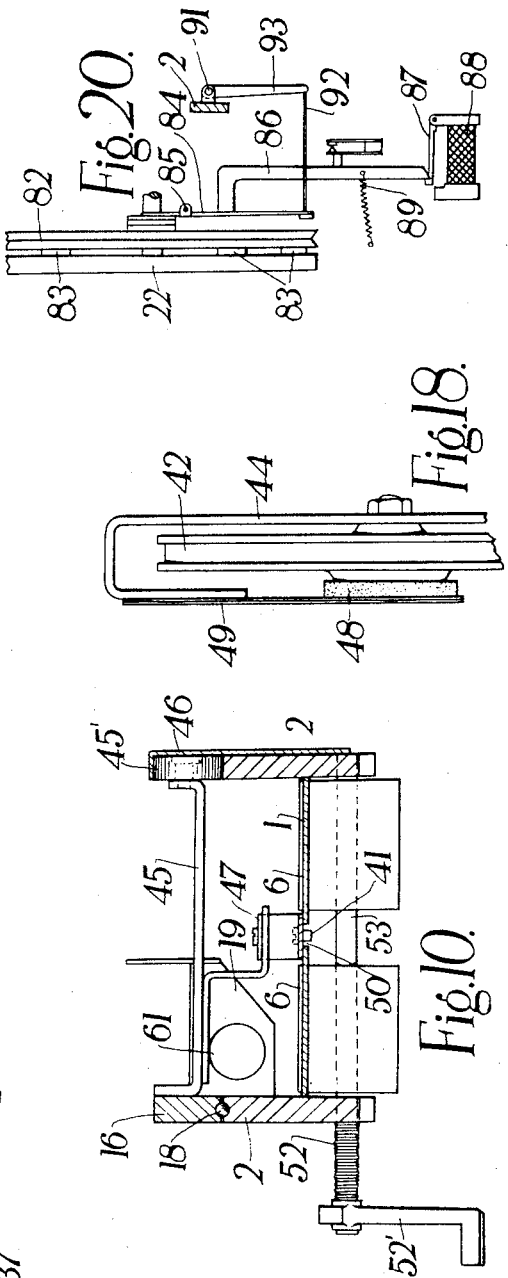

Inventors
D. Macadie
C. F. Ratcliff
By [signature]
Atty

Jan. 16, 1934.    D. MACADIE ET AL    1,943,940
MACHINE FOR SORTING DOCUMENTS AND THE LIKE PROVIDED WITH
STATISTICAL OR OTHER DETERMINATIVE PERFORATIONS
Filed Dec. 4, 1931    5 Sheets-Sheet 5
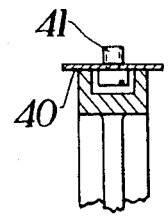
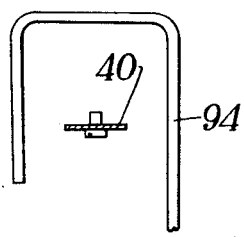
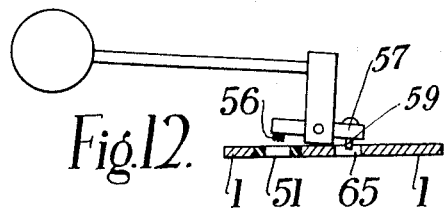
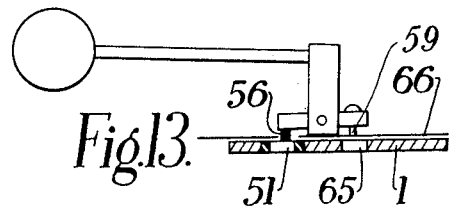
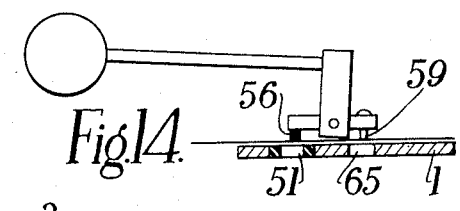
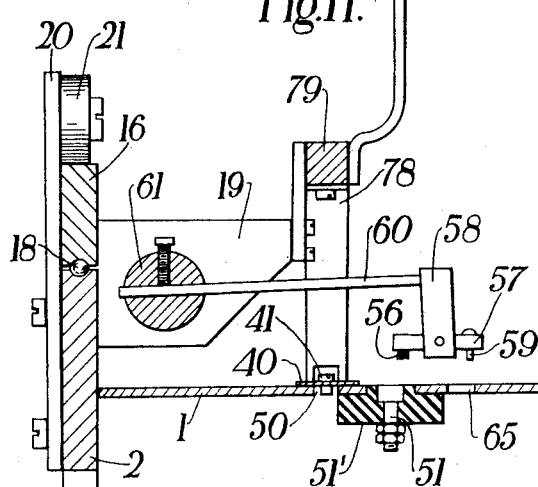
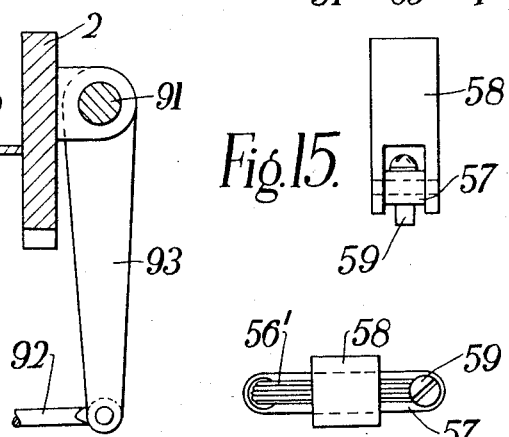
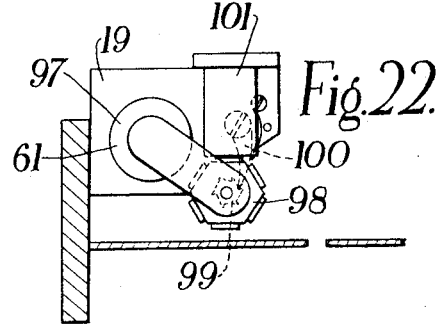
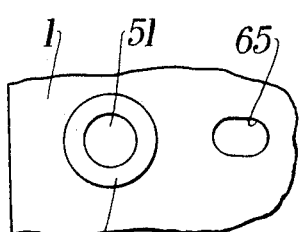
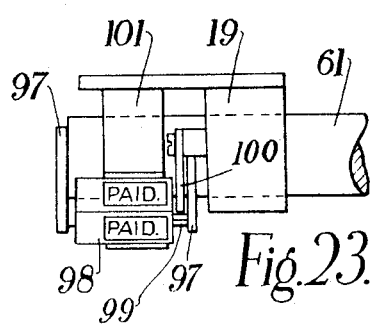
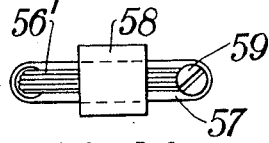
Inventors
D. Macadie
C. F. Ratcliff
by [signature]
Atty.

Patented Jan. 16, 1934

1,943,940

UNITED STATES PATENT OFFICE 1,943,940

MACHINE FOR SORTING DOCUMENTS AND THE LIKE PROVIDED WITH STATISTICAL OR OTHER DETERMINATIVE PERFORATIONS

Donald Macadie, London, and Charles Frederic Ratcliff, Strechford, England

Application December 4, 1931, Serial No. 579,074, and in Great Britain January 3, 1931

10 Claims. (Cl. 209—110)

The invention relates to machines for sorting documents and the like which are provided with statistical or other determinative perforations, and while it is not restricted to a machine intended to sort thin paper documents, such as cancelled pension warrants, postal orders or the like, as, for example, a machine such as described in the specification of Letters Patent No. 1,572,809, wherein the documents are fed one at a time from a pile to a track, along which they are then fed periodically and are deflected therefrom by interceptors or shutters operated by pneumatic or electrical means controlled by the statistical perforations in the documents, it is particularly applicable to such a machine.

Pension warrants, postal orders or like documents are not only liable to be crumpled when used, but, as they are torn from a counterfoil, are also apt to be left with an irregular edge and consequently present difficulties when they have to be fed into and through a sorting machine and are to be deposited in neat piles, especially if the machine is to be worked at a high speed.

Such documents, moreover, are usually cancelled after use by a stamp, which perforates them and this may interfere with the efficient operation of a sorting machine.

The object of the invention is to overcome the difficulties mentioned above and in such a way as to render the machine generally more efficient at high speeds.

In a machine according to the invention, which preferably has means for feeding the documents one at a time from a pile endwise with the ragged edge forward, an endless conveyor is provided for feeding the documents along the track, the conveyor having means for engaging with the rear straight edges of the documents, and also being adapted to engage with the documents on their upper faces, so as to hold them firmly down on the track.

The track is preferably provided with sides to engage with the straight side edges of the documents, so as to avoid lateral displacement of the documents likely to interfere with the registration of their statistical perforations with their respective holes in the track, in the case of pneumatic control, or with their respective contact studs, in the case of electrical control.

In order to permit of rapid feeding of the documents one at a time from a pile to the track, in spite of their ragged forward edges, the top of the pile engages at its side edges or margins with stops which leave the remainder of the uppermost document free to be slightly raised or arched by a suction picker to allow a reciprocatory edge to be inserted between it and the next document below, the wedge co-operating with a gripper to grip the uppermost document and to deposit it on the track in the required position.

Means hereinafter described are preferably provided to ensure that each document, as it is deflected by an interceptor or shutter into a compartment below the track, shall fall so that it will settle down flat.

One form of the invention, particularly suitable for the sorting of thin paper documents, such as pension warrants or postal orders, into numerical order, and employing electrically operated control means for the shutters, is illustrated by way of example in the accompanying drawings, in which:—

Figures 1, 2 and 3 are a front elevation, a plan and rear elevation respectively, of the machine;

Figure 4 is a diagrammatic plan showing the positions of the contact studs relatively to the shutters which they control.

Figures 8, 9 and 10 are a front sectional elevation, a plan and an end elevation, respectively, of a shutter, Figures 8 and 10 also showing the conveyor band driving means.

Figure 11 is an end sectional elevation showing a shutter controlling contact arm.

Figures 12, 13 and 14 are diagrammatic views showing various positions of a contact arm.

Figures 15 and 16 are detail views of parts of the contact arms.

Figure 17 is a plan view of a contact stud.

Figure 18 is an end elevation of a conveyor-band pulley provided with a brake to prevent overrunning of the band.

Figure 19 is a section through the rim of a pulley.

Figure 20 is a diagrammatic end elevation of devices employed for stopping and starting the machine.

Figures 22 and 23 are a side and a front elevation, respectively, of a cancelling device for the documents to be sorted.

Figure 5:
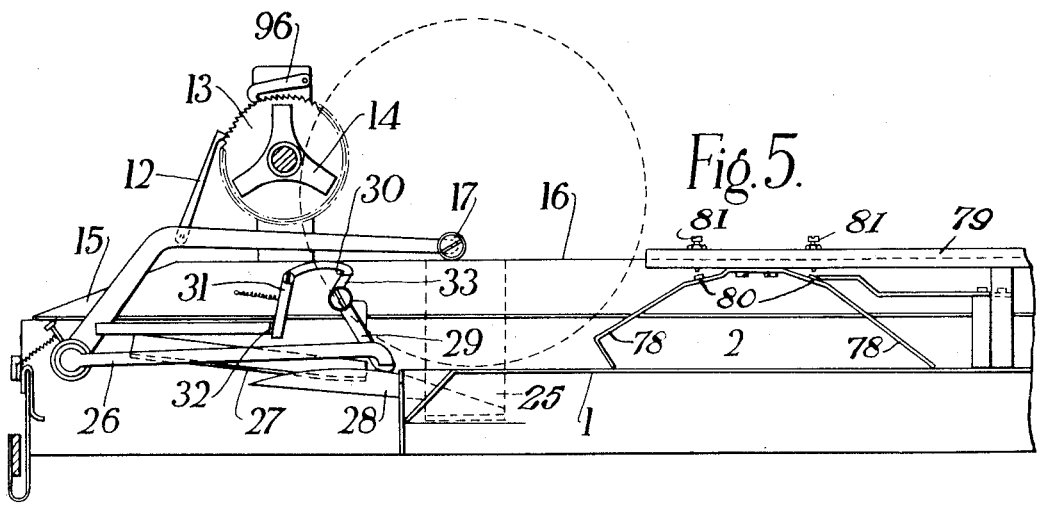
Figures 5 and 6 are, respectively, a front sectional elevation and a plan of the feeding end of the machine.
Figure 6:
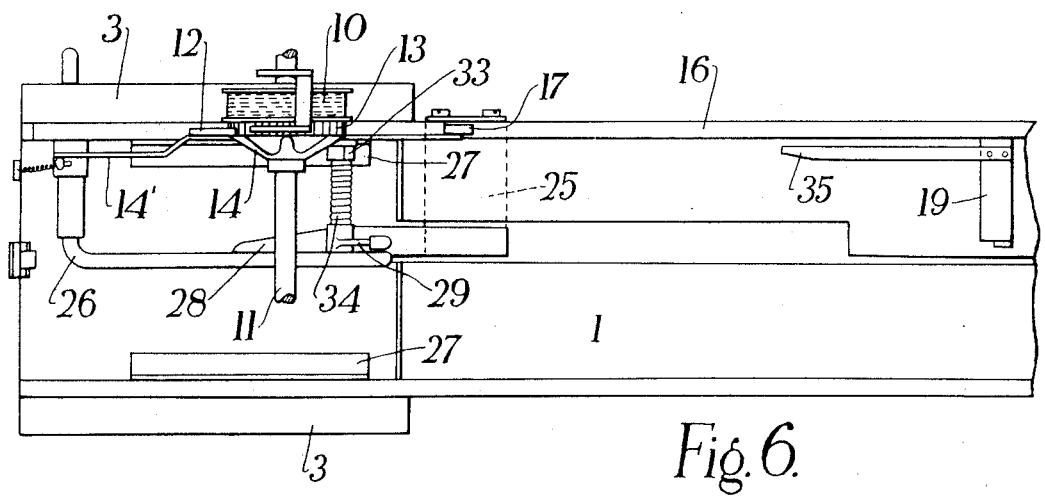

A flat track 1 is supported by side rails 2, which are mounted on end standards 3 and 4. The documents to be sorted pass along the track, guided at their side edges by the rails 2. Slots 5, normally closed by shutters 6, are provided in the track, through which the sorted documents can pass into compartments 7. Hinged doors (not shown) may be provided for the compartments to facilitate the removal of documents therein and the shutters 6 may be operated as described in specification No. 1,572,809, but preferably as hereinafter described.

The documents to be sorted are fed onto the track one at a time from a pile in a manner similar to that described in the above mentioned specification.

The standard 3 forms a guide for a feeding elevator 8, which is raised by chains 9 wound onto drums 10 fast on a cross spindle 11 mounted above the guide rails 2. The spindle 11 is given a periodical partial rotational movement by means of a pawl and ratchet wheel device 12, 13. The ratchet wheel 1 drives the spindle 11 through a spring slip clutch device 14. The pawl 12 is mounted on a lever 14' pivotally mounted on a side rail 2. The lever is rocked by a cam 15 formed on the end of a reciprocatory bar 16 engaging with a roller 17 on the lever. The bar 16 slides on the upper edge of the rear rail 2. Ball bearings 18 may be provided to reduce friction. Blocks 19 secured to the rail act as guides on one side of the bar, while brackets 20 having rollers 21 (Figure 11) spaced at intervals along the rail also serve to guide the bar. The bar is moved by a crank disc 22 and connecting rod 23, the disc being mounted on a main cross shaft 24.

Figure 7:
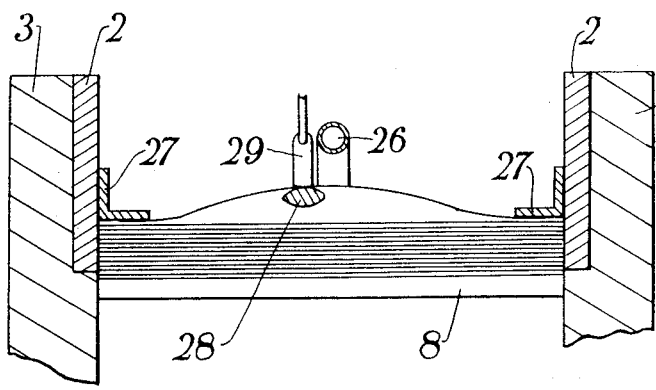
Figure 7 is an end sectional elevation through the pneumatic picker and the gripper.

The downward movement of the lever 14' causes a pneumatic picker tube 26 to descend onto the uppermost warrant of the pile on the elevator and the upward movement of the picker pulls the warrant upwards. The picker engages with the front end of the warrant, the side margins of which are held down by stops 27, so that the warrant is arched, as is shown in Figure 7.

When the bar 16 moves towards the left (Figure 5) and the picker has arched the warrant, a wedge or blade 28 carried by a bracket 25 on the bar passes under the raised warrant and at the end of the movement of the bar, a gripper finger 29 closes down to hold that warrant between itself and the blade 28. The gripper is normally held in a raised or open position by a tooth 30 on a spring controlled bell crank lever 31 pivoted on the bar 16. As the bar reaches the extreme left hand position, the free end of the bell crank lever encounters a fixed stop 32, which rocks its tooth 30 away from a lug 33 attached to the pivot stud of the gripper, so that the gripper can descend under the action of a torsion spring 34.

The bar 16 then moves towards the right to carry the uppermost document onto the track. At the end of this movement, the document is released by the lug 33 encountering a fixed stop 35 which rocks the lug under the tooth 30.

The picker tube 26 is connected by a pipe 36 to a bellows 37 operated by an eccentric and rod 38, 39 (Figure 3), whereby the necessary suction is obtained.

As each document is drawn onto the track 1, it passes under the lower strand of an endless band conveyor 40.

The conveyor band consists of a thin flexible steel band provided with pins 41, spaced at equal distances along its length and projecting from both faces of the band. The band 40 passes over two light, freely mounted pulleys 42, 43, mounted above, and one at each end of, the track. The pulley 42 is carried by a bracket 44 mounted on a front rail 2.

The band is given a periodic movement through distances corresponding to the pitch of the pins, the pitch of the pins being equal to the pitch of the slots 5 in the track 1.

Figure 8:
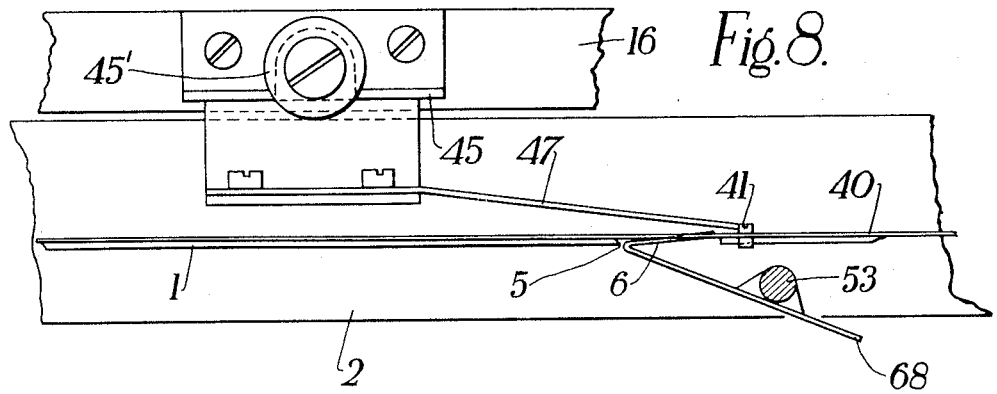

Referring to Figures 2, 8 and 10, a bracket 45, mounted on the bar 16, spans the track 1 and is provided with a roller 45' running between the upper edge of one rail 2 and a flanged guide plate 46 attached to said rail. A spring blade 47 is attached to the bracket 45.

As the bar 16 moves towards the right, the blade engages behind a pin 41, projecting from the upper face of the lower strand of the band 40, to move the band through a distance equal to the stroke of the crank 22 and the pitch of the pins 41. The return movement of the bar leaves the band stationary and at the end of the movement, the blade 47 encounters the next pin, yields upwardly and snaps down behind that pin ready to move the conveyor through another step. It will be appreciated that by this means, the pins 41 are always arrested at definite positions along the track. To ensure that the band does not travel too far owing to the momentum of the pulleys 42, 43, and that it shall not move back slightly as the blade 47 passes over a pin, a friction brake is provided for the pulley 42. A cork or other pad 48 is pressed by spring blades 49 against the central boss of the pulley, to restrain it from revolving too freely (Figure 18).

Each unsorted document deposited onto the track by the grippers is in a position under the lower strand of the band 40 to have its rear edge encountered by a pin 41, so that as the band moves, the document is pushed along by the pin, between the track and the band. A slot 50 is provided along the centre of the track to permit the free passage of the pins and to allow the band to hold the document flat on the track.

When the documents to be sorted, like pension warrants or postal orders, have a ragged edge, due to the tearing off of counterfoils, they are fed along the track with the ragged edges forward, the pin being in contact with the even straight edge.

Each document is provided with determinative or statistical perforations representing, for instance, a digit in a certain denomination of the serial number of that warrant.

By choosing a suitable position for each perforation, an order may be passed through the machine to be sorted into one denomination, and then by turning the order over and passing it through again, the same perforation may be employed for sorting the order into another denomination.

Figure 21:
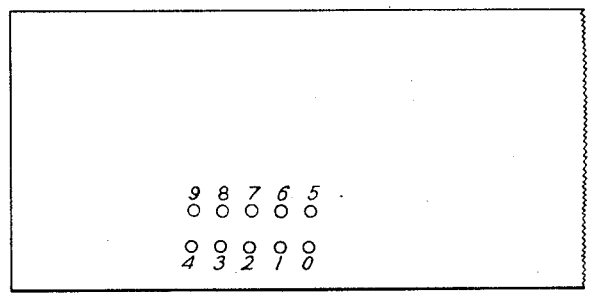
Figure 21 is a diagram of the perforations for postal orders.

The machine shown is suitable for the sorting of postal orders. The perforation of each digit is a definite distance from the rear edge of the order and from one side edge. The relative positions of the perforations representing the digits of 0 to 9 are shown diagrammatically in Figure 21.

Each postal order or other document is fed by the band 40 in equal step by step movements along the track, so that the rear edge of the postal order or other document is arrested at definite positions along the track. As described in specification No. 1,572,809, each shutter or interceptor 6 is controlled by a determinative point situated in front of the shutter, with which point the perforation in the postal order must register to permit the operation of the shutter.

In the machine illustrated in the accompanying drawings, each shutter 6 is maintained in a lowered or closed condition to permit the free passage along the track of all documents except those of the digit which it is to deflect. In the present example, the determinative point on the track is an electric contact stud 51 insulated from the track 1 by an ebonite or other similar bushing 51'.

Each shutter or interceptor is held closed against the action of a torsion spring 52 on its pivot spindle 53 by a latch 54 engaging with the end of a short lever 52' attached to the spindle 53.

The latches 54 form the armatures of electro-magnetic devices 54' which, when energized, withdraw the latches from the levers and so permit the opening of the shutters or interceptors.

Associated with each contact stud 51 is a movable contact 56 (Figures 2 and 11).

Each contact 56 is attached to one end of a small bar 57 pivoted to a hammer head 58. A pin 59 is attached to the other end of the bar 57. The heads 58 are carried by pins 60 which are attached to an oscillatory shaft 61 journalled in the blocks 19. A bent lever 62 (Figure 2) is secured to one end of the shaft and is rocked downwards by means of a cam 63 on the main shaft 24 and returned by a spring 64.

The cam 63 is so timed that the contacts 56 are moved to and from the track each time the conveyor band 40 halts.

Normally the hammer heads 58 strike the track and each pin 59 enters a hole or recess 65 adjacent to the associated contact 51; thus, as shown in Figure 12, the contacts 51 and 56 do not close to energize the electro-magnetic devices 54' to open the shutters 6.

However, should a document 66 be brought into the position shown in Figure 13, so that its perforation coincides with the contact stud 51, but so that the document prevents the pin 59 from entering the hole 65, the bar 57 is rocked to close the contacts 51 and 56 and thereby to open the shutter 6 of the associated compartment 7. The next feeding movement of the conveyor 40 will push that document through the opened slot 5.

If a document is arrested over a fixed contact 51, but does not have its perforation in registration therewith, that document may obstruct the entrance of the pin 59 into the hole 65, as shown in Figure 14; the document acts as an insulator between the two contacts to prevent the opening of the shutter controlled by those contacts.

To ensure a good closing of the contacts, each contact 56 may be composed of a number of wires 56' looped round the head of the pin 59, so that each wire forms, as it were, a spring contact point. This is shown best in Figure 16.

Figure 9:
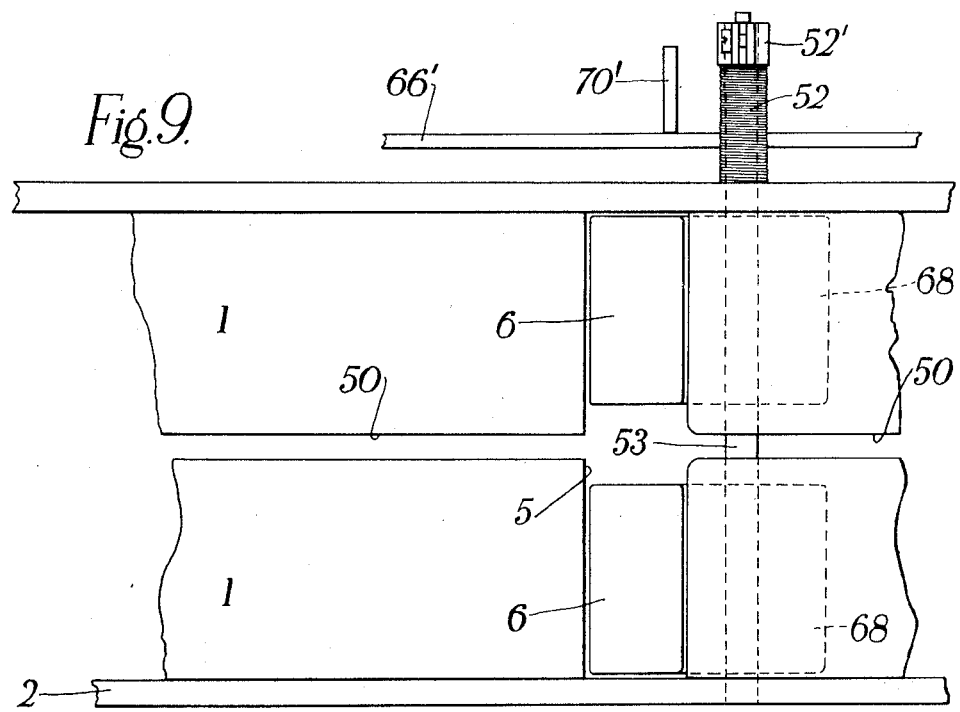

Immediately a document has passed through an opened slot 5, the shutter or interceptor is closed down. This is done by means of a reciprocatory bar 66' (Figures 3 and 9). This bar is moved by means of a cam 67 on the main shaft 24, rocking a lever 68 which is connected to the bar by a lever 69. The bar 66' has a number of pins 70', each of which lies adjacent to one of the levers 52', so that movement of the bar will move the pins against any levers which have been released and so rock them to close their shutters which are held closed by the re-engagement of the latches 54 with the levers 52'.

It will thus be appreciated that a shutter can only be opened to intercept the correct document when a document is arrested with its perforation in registration with the associated contact stud.

Eleven compartments 7 are provided for the reception of the sorted documents, the last one being for documents which for any reason whatever have not been sorted in the ordinary way. This compartment is not provided with a controlling shutter 6, as it is intended to receive all unsorted documents.

As will be seen from Figures 1 and 8, the shutter has a downwardly extending guide member 68 which can direct a document onto a curved baffle plate 69 in the top of a compartment 7. Thus, as a document enters the compartment, its leading edge is directed onto a stop 70 about which the order tends to pivot to a substantially horizontal position which ensures the even piling of the documents. The documents pile up onto false bottoms 71 in the compartments 7. All the bottoms are connected to a bar 72 which can be raised and lowered by chains 73 wound round a cross shaft 74. The shaft 74 is connected to the shaft 11 by means of pulleys 75 and a belt 76. By this arrangement, as the elevator rises, the bottoms descend and vice versa. By choosing a suitable ratio between the diameters of the drums 10 and of the shaft 74 and of the pulleys 75, the height of the uppermost documents of the piles in the compartments may be kept approximately constant to ensure that the documents fall through an approximately constant distance onto the piles.

Provision is made to stop the machine in the event of a document crumpling up and not passing along the track.

Spring blades 78 (Figure 5) are mounted at intervals on a bar 79 carried by the blocks 19. The free end of each blade bears upon the upper face of the lower strand of the band 40, their ends being forked as shown in Figure 11, to permit of the free passage of the pins 41. Each blade carries a contact 80, each of which can close with a contact screw 81 in the bar 79 if a document crumples up and lifts the band 40 off the track. This closing of the contacts frees a friction clutch drive. A driving pulley 82 is freely mounted on the main shaft 24 and has friction pads 83. The pads may be moved into contact with the crank disc 22, which is fast on the shaft, by a lever 84 pivoted to the stationary part of the machine at 85. The clutch members are normally held in engagement by an extension 86 of the lever 84, being held by a latch 87 controlled by an electro-magnetic device 88. Immediately the contacts 80, 81 close, the device 88 is energized to free the lever 86 which is acted upon by the spring 89 to release the clutch members.

Stopping and starting of the machine may also be effected by handles 90, attached to a spindle 91, which is connected to the lever 84 by a link 92 and a lever 93.

The shutters or interceptors 6 have a central division to permit of the free passage of the conveyor band 40. If desired, guides 94 (Figures 1 and 11) may be provided for the band, while the pulleys 42 and 43 have grooves in their peripheries which receive the pins 41 and prevent the band slipping from them (Figure 19).

The friction clutch device 14 between the ratchet wheel 13 and the shaft 11 enables the elevator 8 and the false bottoms 71 to be raised and lowered by hand cranks 95 without the necessity of disengaging the pawl 12, a detent 96 preventing the ratchet wheel from rotating against the pawl.

If desired, a printing device may be attached to the feeding end of the machine to print a cancelling mark on each postal order or other document before it is sorted.

Such a device is shown in Figures 22 and 23. The feeding end of the oscillatory shaft 61 may be extended beyond the end block 19, and carry two radial arms 97 pivotally supporting a hexagonal drum 98, on each face of which is a rubber stamp bearing the word "Paid". A ratchet wheel 99 is attached to one end of the drum 98 and co-operates with a pawl 100 pivoted to the adjacent lock 19. As the shaft 61 rocks to move the contacts 56 towards the track 1, the lowermost stamp is impressed on to the document which has just been pulled on to the track by the gripper device 28, 29. As the shaft 61 rocks back again, the pawl co-operates with the ratchet wheel to turn the drum to present another stamp to an inking pad 101 carried by the block 19. A spring detent may be employed to hold the drum in any position during inking and printing.

We claim:

1. A machine for sorting documents and the like provided with determinate perforations, comprising a track having a series of successive interceptors, each movable from an inoperative position, in which it permits a document to pass along the track over the interceptor, to an operative position, in which it intercepts a document in its travel along the track and deflects it therefrom, an endless conveyor arranged above and along said track to engage with the upper faces of documents thereon and having means for engaging with the rear edges of said documents to propel them along the track, means for imparting periodic feeding movements to said conveyor, means for supporting a pile of documents adjacent to the feeding end of said track, marginal stops for engagement with the side edges of the uppermost document of the pile, means for pressing the pile upwards against said marginal stops, a picker for raising the central portion of the uppermost document of the pile while retained by said marginal stops, a reciprocatory gripper for engaging with the raised document, and means for operating said gripper in synchronism with the periodic movements of the conveyor and means for releasing each document removed by the gripper from the pile in a position for engagement with the conveyor, substantially as hereinbefore set forth.

2. A machine for sorting documents and the like provided with determinative perforations, comprising a track having a series of successive interceptors, each movable from an inoperative position, in which it permits a document to pass along the track over the interceptor, to an operative position, in which it intercepts a document in its travel along the track and deflects it therefrom, and means for feeding the documents along the track comprising an endless thin metal band, freely mounted pulleys for supporting said band, pins on said band for engagement with the rear edges of said documents, a reciprocatory bar having a blade for engagement with said pins, and means for reciprocating said bar for the purpose of imparting periodic feeding movements to said band through said blade and pins.

3. A machine for sorting documents and the like provided with determinative perforations, comprising a track having a series of successive interceptors, each movable from an inoperative position, in which it permits a document to pass along the track over the interceptor, to an operative position, in which it intercepts a document in its travel along the track and deflects it therefrom, means for feeding the documents along the track comprising an endless thin metal band, freely mounted pulleys for supporting said band, pins on said band for engagement with the rear edges of said documents, a reciprocatory bar having a blade for engagement with said pins, means for reciprocating said bar for the purpose of imparting periodic feeding movements to said band through said blade and pins, and a brake for arresting one of said pulleys after each periodic feeding movement for the purpose of retaining the pins and, therefore, the documents in definite positions.

4. A machine for sorting documents and the like provided with determinative perforations, as claimed in claim 3, including a detent for each interceptor, electric operating means therefor including electro-magnetic means, a contact fixed in the track in advance of the corresponding interceptor, and adjacent to a hole in the track, a movable contact, a bar carrying said movable contact on one end thereof, a hammer head on which said bar is pivotally mounted at a point intermediate of its ends, a pin on said bar on the opposite end to that on which the movable contact is carried, means for periodically oscillating said hammer head in synchronism with the movements of the means for feeding documents along said track, the pin on the aforesaid bar being adapted to coincide with the hole in the track when the hammer head is lowered, so that so long as a document is present which obstructs said hole and also has a perforation which registers with the contact on the track, the pin is prevented from entering the hole and the contact bar is tilted to effect engagement of the contact on the bar with that on the track, no engagement of the contacts occurring when the hole is unobstructed by a document.

5. A machine for sorting documents and the like provided with determinative perforations, comprising a track having a series of discharge openings arranged one behind the other along said track, a series of interceptors each pivotally mounted adjacent to one of said openings, means for periodically moving said interceptors into operative document intercepting position, means for moving them into inoperative position to allow passage of documents over them, an endless metal conveying band extending along and above said track and adapted to feed documents periodically one behind the other along said track, driving means for said machine including a driving clutch, electro-magnetic means for controlling said clutch, an electric circuit for supplying current to said electro-magnetic means, and means for stopping the machine when a crumpled or other defective document fails to pass along the track, comprising a spring blade electrical contact in the circuit of said electro-magnetic means, said spring blade bearing lightly upon the upper surface of the lower strand of the endless band conveyor and movable into electrical connection with a cooperating stationary contact above the track when the band is raised off the track by the slight crumpling of a document, to complete the electrical circuit of said clutch controlling means which then permits the release of said clutch and the stopping of the machine.

6. A machine for sorting documents and the like provided with determinative perforations, comprising a track having a series of discharge openings arranged one behind the other along said track, a series of interceptors each pivotally mounted adjacent to one of said openings, means for periodically moving said interceptors into operative document intercepting position, means for moving them into inoperative position to allow passage of documents over them, an endless thin metal conveyor band adapted to feed documents one behind the other along said track, elevator means for supporting a pile of documents at the feeding end of the track, means for transferring the documents one at a time to said track to be fed therealong by said conveyor band, compartments beneath the track corresponding to the interceptors, each compartment having a false bottom, all of said false bottoms being connected to said elevator means through a reduction gear so that an upward movement of the elevator means causes a smaller downward movement of the false bottoms, substantially as and for the purpose hereinbefore set forth.

7. A machine for sorting documents of the type defined provided with determinate perforations, comprising a track over which the documents are fed, interceptors operating through the track to deflect the documents relative to the track when the interceptors are in operative position, an endless band overlying the track and bearing upon the documents, document-feeding means carried by the band, means for feeding the band and thereby the documents a determinate distance lengthwise the track, and means on the track for cooperation with perforations in the documents and operating in such cooperation to actuate a selected interceptor, the contact of the band and documents serving to accurately limit the fed position of a particular document to permit the particular perforation in such document to accurately register with the cooperating track element for the selection of the predetermined interceptor.

8. A machine for sorting documents of the type defined provided with determinate perforations, comprising a track over which the documents are fed, interceptors operating through the track to deflect the documents relative to the track when the interceptors are in operative position, an endless band overlying the track and bearing upon the documents, the band being of less width than the similar dimensions of the documents, document-feeding means carried by the band, means for feeding the band and thereby the documents a determinate distance lengthwise the track, means on the track for cooperation with perforations in the documents and operating in such cooperation to actuate a selected interceptor, the contact of the band and documents serving to accurately limit the fed position of a particular document to permit the particular perforation in such document to accurately register with the cooperating track element for the selection of the predetermined interceptor.

9. A machine for sorting documents of the type defined provided with determinate perforations, comprising a track over which the documents are fed, interceptors operating through the track to deflect the documents relative to the track when the interceptors are in operative position, an endless band overlying the track and bearing upon the documents, document-feeding pins carried by the band, means for feeding the band and thereby the documents a determinate distance lengthwise the track, and means on the track for cooperation with perforations in the documents and operating in such cooperation to actuate a selected interceptor, the contact of the band and documents serving to accurately limit the fed position of a particular document to permit the particular perforation in such document to accurately register with the cooperating track element for the selection of the predetermined interceptor.

10. A machine for sorting documents of the type defined provided with determinate perforations, comprising a track over which the documents are fed, interceptors operating through the track to deflect the documents relative to the track when the interceptors are in operative position, an endless band overlying the track and bearing upon the documents, document-feeding means carried by the band, a reciprocatory bar for engagement with the document-feeding means, and means for reciprocating the bar to feed the band and thereby the documents a predetermined distance lengthwise the track, and means on the track for cooperation with the perforations in the documents and operating in such cooperation to actuate a selected interceptor, the contact of the band and documents serving to accurately limit the fed position of a particular document to permit such document to register the particular perforation therein with the cooperating track element for the selection of the predetermined interceptor.

DONALD MACADIE.
CHARLES FREDERIC RATCLIFF.